J. T. Barnes,
Furniture Caster.
No. 2,644. Reissued June 11, 1867.
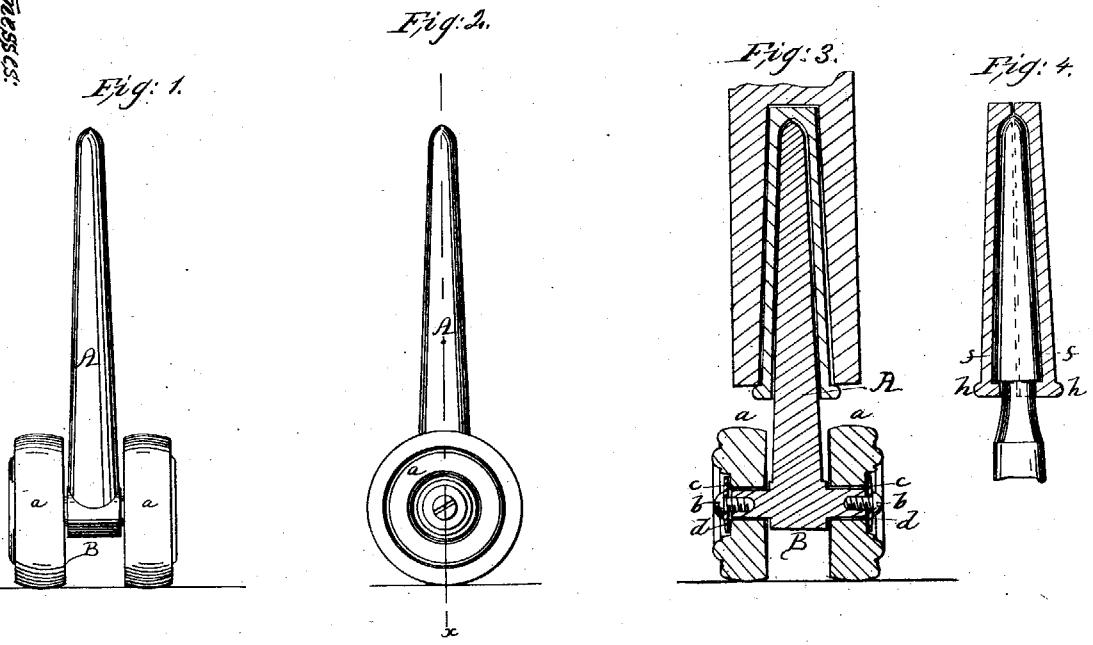
Witnesses:
G. W. Blossington
Wm. Brewer
Inventor:
James T. Barnes
For Munn & Co
Attorneys
N. PETERS, PHOTO-LITHOGRAPHER, WASHINGTON, D. C.

United States Patent Office.

JAMES T. BARNES, OF HUDSON CITY, NEW JERSEY.

*Letters Patent No.* 59,163, *dated October* 30, 1866; *reissue No.* 2,644, *dated June* 11, 1867.

IMPROVED CASTER.

The Schedule referred to in these Letters Patent and making part of the same.

TO ALL WHOM IT MAY CONCERN:

Be it known that I, JAMES T. BARNES, of Hudson City, Hudson county, State of New Jersey, have invented a new and improved Furniture Caster; and I do hereby declare that the following is a full, clear, and exact description thereof, which will enable others skilled in the art to make and use the same, reference being had to the accompanying drawing forming part of this specification, in which—

Figure 1 is a front elevation of my invention.

Figure 2 is a side elevation of the same.

Figure 3 is a longitudinal section of my invention taken on the plane of the line *x x*, fig. 2.

Figure 4 is a view showing the means I adopt for preventing the shank of a caster dropping out of its socket accidentally.

Furniture casters, as ordinarily constructed, consist in a shank having two jaws at its lower end set at an angle with the shank, between which jaws the roller or wheel is pivoted by a rod passing through the wheel and secured in the said jaws. These casters, as almost every one knows, are liable to break. Very often one of the jaws snaps off, which renders the caster useless; in other cases the rod gets bent, so that the wheel will not turn, or it works out of the jaws, and the wheel becomes inoperative; in still other cases the wheel, by reason of the angular position of the jaws relatively to the shank, is not directly under the centres of the leg of the piece of furniture, and consequently the shank is continually bearing heavily against one or the other side of its socket, and this in many cases causes the socket to break, especially in the case of heavy furniture; and with the legs of small articles, such as chairs, this is likely to tear the socket out, carrying some of the wood of the leg with it. Again, a great deal of trouble and bother is occasioned by the caster not turning when the piece of furniture is changed from being moved in one direction to another. The edge of the wheel in such cases usually scrapes the carpet and raises it up in ridges.

The object of my invention is to produce a caster which shall possess none of the above disadvantages. My invention consists in the employment of two wheels, which are mounted on an axle secured to the end of the shank, so that when the caster is applied to the legs of a piece of furniture the wheels will be directly under the said legs, and I am also enabled to provide large and strong axles for the wheels without rendering the casters cumbersome. My invention also consists in having the shank attached to the centre of the axle, so as to extend upward between the two wheels of the same, which renders the caster far less cumbersome than usual, and also more efficient, as the wheels are at a greater distance apart and afford a better support to the piece of furniture or article to which the caster may be applied. My invention further consists in enlarging the shank of a caster on two of its sides, so as to form a shoulder near its lower end, facing downwards, and in forming a rib around the inside of the mouth of the socket, so that the said shank can be sprung in the socket and turn freely therein, without any liability of its falling out, should the leg of the piece of furniture be raised to a greater height than the length of the shank.

A designates the shank of a caster-wheel, which shank is of the usual shape and construction, the second feature not being applied to this wheel. To the end of this shank an arm, B, is secured, the ends of which form the axles *d d* for the wheels *a a*, one being on each side of the shank. The wheels are held on their axles *d* by a bolt, *b*, and washer *e*, or in any other suitable manner.

It will be noticed that the axles of the wheels are very large in comparison to the small rod usually employed for the wheels of ordinary caster-wheels to turn upon. Herein I am enabled to gain great strength without making the caster large or cumbersome. The peripheries of the wheels are rounded off, so that there shall be no sharp corners to scrape upon a carpet or upon a floor. The shank A, it will be seen, extends upward centrally from the axle between the two wheels *a a'*, and the latter are, therefore, at a considerable distance apart, as shown in figs. 1 and 3, and form a good and efficient support for the article to which the caster may be applied. My invention, therefore, differs materially from those two-wheel casters which have a forked shank between which the wheels work. These casters are cumbersome, and do not form a good and efficient support. It will be also noticed that the wheels are directly under the leg of the piece of furniture; hence, however quickly the direction of the motion of the piece of furniture be changed, the wheels will be ready to start on their path in that direction. This, as before stated, is not the case with ordinary casters, though it is, to a certain extent, with the "ball casters." The socket C employed with this caster is cast in two parts as ordinary casters. In fig. 4 the shank of the caster is enlarged on two of its sides, as shown at *f f*, a shoulder on each side being formed near the lower extremity of the shank. The socket is made in two parts, as usual, but around the inside, near the mouth, a ridge, *h*, is formed. This socket is to be thrust into the bore in the leg of the piece of furniture sufficiently tight to retain its place, or it can be secured by screws passing through a flange around its mouth. This shank is applied by placing it so that its two enlarged sides will bear against opposite sides of each half of the socket; this can then be forced into the socket, which latter will give sufficiently to allow it to enter, and as soon as it is introduced will close, so as to cause the shoulders *f* to rest upon the ridges *h*, and thus keep the shank from falling out, as can be readily seen by reference to said fig. 4.

Having thus described my invention, what I claim as new, and desire to secure by Letters Patent, is—

1. The caster constructed as described, having the shank A cast directly upon the central portion B of the axle between the two wheels, as herein set forth for the purpose specified.

2. The arrangement of the wheels *a a*, in combination with the shouldered shank A, arm B, with its axles *d d*, and the washers *e* and bolt *b*, substantially as and for the purpose herein shown and described.

3. The shank A, enlarged upon two of its sides to form a shoulder, *f*, fitting and turning loosely from the rib *h* upon the inside of the mouth of the socket C, said socket being sprung open to receive the shank, as herein set forth for the purpose specified.

JAS. T. BARNES.

Witnesses:

WM. F. MCNAMARA,

ALEX. F. ROBERTS.